United States Patent [19]

Maurer et al.

[11] Patent Number: 4,654,203

[45] Date of Patent: Mar. 31, 1987

[54] PROCESS FOR THE CHEMICAL THERMODECOMPOSITION OF HIGHER HALOGENATED HYDROCARBONS

[75] Inventors: Paul-Gerhard Maurer, Neuberg; Daniel Neupert, Alzenau, both of Fed. Rep. of Germany

[73] Assignee: Nukem GmbH, Hanau, Fed. Rep. of Germany

[21] Appl. No.: 811,387

[22] Filed: Dec. 20, 1985

[30] Foreign Application Priority Data

Dec. 24, 1984 [DE] Fed. Rep. of Germany ....... 3447337

[51] Int. Cl.[4] ............................................ B01D 53/36

[52] U.S. Cl. .................................. 423/240; 252/373; 423/245

[58] Field of Search ............ 423/240 S, 245 S, 415 A, 423/651; 252/373

[56] References Cited

U.S. PATENT DOCUMENTS 3,845,191 10/1974 Bruce, Jr. ........................ 423/240 S
4,201,751 5/1980 Holter et al. .................... 423/240 S

*Primary Examiner*—John Doll
*Assistant Examiner*—Jeffrey Edwin Russel
*Attorney, Agent, or Firm*—Cushman, Darby & Cushman

[57] ABSTRACT

A halohydrocarbon is destroyed chemical-thermally by reacting at 600° to 800° C. with calcium oxide and/or calcium hydroxide. The process can be carried out problem-free by having the calcium oxide of hydroxide present in at least twice the stoichiometric excess based on the halogen to be bound and by having the composition contain 2-30 wt. % iron oxide.

12 Claims, No Drawings

PROCESS FOR THE CHEMICAL THERMODECOMPOSITION OF HIGHER HALOGENATED HYDROCARBONS

BACKGROUND OF THE INVENTION

The invention is directed to a process for the chemical-thermal decomposition of highly halogenated hydrocarbons by reaction with calcium oxide and/or calcium hydroxide in an above stoichiometric ratio at a temperature of 600° to 800° C. in a reactor.

Highly halogenated hydrocarbons are frequently employed in industry and research. Thus, fluorohydrocarbons serves as propellant gases and refrigerants and are the starting materials for the production of chemically very resistant synthetic resins. Chlorohydrocarbons are employed in large amounts as defatting agents in metal working operations. Further areas of use are chemical purifications of all types. Furthermore, the chlorohydrocarbons are starting materials for the production of polymers, pesticides, and herbicides. Especially because of their high chemical and thermal resistance, the polychlorinated hydrocarbons are employed as heat transfer oils or hydraulic fluids. The polychlorinated biphenyls (PCB) are typical members of this class of material.

Although insofar as this is industrially possible and economically suitable, use is made of the possibility of recycling used halohydrocarbons, there accumulate in the Federal Republic of Germany yearly about 30,000 to 40,000 metric tons of chlorohydrocarbons having a chlorine content of $>20\%$ which must be disposed of.

With these so-called special wastes in addition to residues from recycling plants and production residues, it is a question of materials whose use from the point of view of safety and the industrial environment is continuously being reduced and which finally must be disposed of. The best known example of these materials are PCB which in the past were employed chiefly as transformer oils and as dielectrics in condensers. Through the exchange of these liquids for replacement materials alone, it has been calculated that for the Federal Republic of Germany in the next ten years there will be the need to dispose of about 6,000 metric tons yearly of polychlorinated biphenyls.

At the present time, the only prominent possibility for disposal of halohydrocarbons is burning at sea. International agreements (Oslo and London conventions), however, have the goal is to completely limit the burning at sea until the end of this decade. As the alternative thereto, there only remains burning on land. The burning of halohydrocarbons, especially fluorinated and highly chlorinated hydrocarbons in existing special waste combustion plants is problematical. The basic reasons for the difficulties are the danger of corrosion to the brickwork and the waste gas zone because of high crude gas loading of a hydrogen halide (HF and HCl), the emission situation, especially in burning fluorinated hydrocarbons and the high energy input.

Especially through the circumstance that with insufficient burning conditions with the burning of chlorohydrocarbons, highly toxic polychlorinated dibenzodioxine and dibenzofurane can be formed, there is placed increasing criticism on this disposal practice.

In German OS No. 3028193 (and related Hofmann U.S. application Ser. No. 287,120 filed June 27, 1981, the entire disclosure of which is hereby incorporated by reference and relied upon), there is described a process for the pyrolytic decomposition of halogen and/or phosphorus containing organic materials in which these are reacted with an above stoichiometric ratio of calcium oxide or calcium hydroxide at a temperature of 300°0 to 800° C. in a reactor.

The disadvantage with this process is that not all halohydrocarbons can be destroyed without problems. The temperatures necessary for the quantitative decomposition of the chemically and thermally very stable highly halogenated hydrocarbons among which there must be especially considered the polychlorinated biphenyls is above 600° C. Above this temperature, mixtures of CaO and $Ca(OH)^2$ with the corresponding calcium chlorides form melts. This fact makes considerable difficulties since the necessary continuous throughput of solids through the reactor is hindered thereby and under some conditions is even impossible. In addition to the industrial process difficulties, the formation of melts simultaneously leads to an increased lowering of the rate of decomposition of the halogenated hydrocarbons. This is traced to the severe reduction of the surface area of the solid reactants, which exerts a considerable influence on the reaction in gas-solid reactions. Even a large excess of the basic compounds mentioned is not able to prevent a formation of melts at temperatures above 600° C. with subsequent incrustation in the cooling-off phase.

Therefore, it was the problem of the present invention to develop a process for the chemical-thermal decomposition of highly halogenated hydrocarbons by reaction with an above stoichiometric ratio of calcium oxide and/or calcium hydroxide at a temperature of 600° to 800° C. in a reactor in which no melts form and in which the waste gases are free of halogen and especially are free of dioxin.

SUMMARY OF THE INVENTION

This problem was solved according to the invention by having the calcium oxide and/or calcium hydroxide present in at least double the stoichiometric excess based on the halogen to be bound and in having present 2 to 30 wt. % iron oxide.

Preferably, there is used a two to five fold stoichiometric excess of calcium oxide and/or calcium hydroxide whereby a portion of the calcium compounds can also be replaced by the corresponding magnesium compounds, i.e., magnesium oxide and magnesium hydroxide. There have proven good iron oxide additions in the amount of 3 to 25 wt. %, whereby the iron oxide can be present as such or in the form of iron oxide containing materials. As iron oxide containing materials, there can be employed, for example, the red sludge which is obtained in the production of aluminum, however, advantageously there is used fly ash from furnaces.

It has been surprisingly found that even at a portion of 2 wt. % iron oxide in the calcium oxide or calcium hydroxide, there is reliably prevented a formation of melt through the calcium chloride formed and the solid mixture present after the decomposition of the halohydrocarbon remains pourable even at a temperature of 800° C. and also does not encrustate in the cooling off.

In addition to its property of preventing encrustations in the present case, the iron oxide added also shows catalytic action on the chemical-thermal decomposition of halohydrocarbons. For the complete decomposition of highly halogenated hydrocarbons, it is sufficient if the amount of calcium oxide and/or calcium hydroxide added, based on the halogen to be bound, is double the over stoichiometric amount. The same good results are not produced without the addition of iron oxide.

Since the reaction of highly halogenated hydrocarbons with calcium oxide to form calcium chloride is exothermic with correspondingly higher dosage rates of the reactants, it may be necessary to remove heat. Cooling of the reactor jacket can be eliminated and heat eliminated by the usual methods of losing heat, radiation, and heat conduction if the calcium oxide of the reaction mixture is partially replaced by calcium hydroxide.

At suitable mixing ratios which can be ascertained readily by experiments in continuous reaction and can be established via suitable dosage devices, even an autothermic reaction is possible in this way. With this process, a continuous chemical thermal decomposition of highly halogenated hydrocarbons can be carried out without further supply of energy.

As an additional possibility for the economical design of the process of the invention, the iron oxide can be replaced by cheaper iron oxide containing material. The use of fly ash has proven especially advantageous. Fly ash is produced in large amount in burning hard coal and lignite in power plants and must likewise be removed so that in employing fly ash no additional costs arise. Typical contents of iron oxide in fly ash are 5 to 18 wt. %. Furthermore, fly ash also contains in part considerably amounts of calcium oxide so that calcium oxide also can be saved.

The gaseous reactants formed are halogen-free. In the case the decomposition of non-perhalogenated hydrocarbons the waste gas contains corresponding amounts of hydrogen, methane, and possibly other partially saturated, partially unsaturated lower hydrocarbons as well as small amounts of carbon monoxide. The waste gas in this case still has a considerable heating value and can be used correspondingly or even simply burned subsequently to carbon dioxide and water in a post reaction chamber.

The chemical-thermal decomposition of highly halogenated by reaction with calcium oxide and/or calcium hydroxide and iron oxide or iron oxide containing materials is a process for disposal of these materials which is very favorable to the environment and is very economical. The formation of metabolites such as polychlorinated dibenzodioxines or furanes does not occur in such a process so that even from this point of view there is no reason to question the safe industrial use of the process.

The process of the invention will be further explained by the following example.

The process can comprise, consist essentially of, or consist of the stated steps with the recited materials.

Unless otherwise indicated, all parts and percentages are by weight.

DETAILED DESCRIPTION

EXAMPLE

The reactor in which the chemical-thermal decomposition of the halohydrocarbons is carried out is the stirred bed reactor described in German OS No. 3028193 and Hofmann U.S. application Ser. No. 287,120. There is present in this reactor about 10 kg of a spherical ballast which rests on a permeable carrier grate for fine particle or powdered solids. The spherical ballast consists of ceramic balls having a diameter of about 16 mm and is rotated with a helical stirrer. The stirrer rotates about 2 revolutions per minute. The stirred bed is heated electrically before feeding in the halogenated hydrocarbon. After reaching operating temperature of 700° C., there is fed into the stirred bed reactor from above a mixture of 40% CaO, 10% $(Ca/OH)_2$, and 50% fly ash containing 8% iron oxide. The dosage rate is about 500 grams/hour. After a preliminary running time of about 10 minutes, there is connected a dosaging pump which feeds into the reactor via a separate supply halohydrocarbons to be decomposed. The waste solution consists of about 40% dichloromethane and 60% polychlorinated biphenyls (PCB). Through the stirring motion of the spherical ballast, the reactants as well as the reaction products are transported downwardly from above through the hot bed of spheres.

After the end of the 2 hour experiment below the carrier grate via a valve there was drawn off about 1500 grams of powdery solids which were collected in a container. This solid mixture contains chiefly excess burned lime and fly ash as well as calcium chloride and iron compounds. It is free from organic materials.

The waste gases escaping from the reactor during the process are free from halogenated hydrocarbons and are post-burned in a post combustion chamber with a slight excess of air.

What is claimed is:

1. A process of chemically-thermally decomposing a halogenated hydrocarbon or halogenated hydrocarbons consisting essentially of reacting reactants consisting of the halogenated hydrocarbons or halogenated hydrocarbon with an excess of at least one member of the group consisting of calcium oxide and calcium hydroxide at a temperature of 600° to 800° C. and in the presence of 2 to 30 wt. % of iron oxide based on the member of said group.

2. The process according to claim 1 wherein the halogenated hydrocarbon includes polychlorinated biphenyls.

3. A process according to claim 1 wherein there is employed a two to five fold stoichiometric excess of the calcium oxide, calcium hydroxide, or mixture of calcium oxide and calcium hydroxide.

4. A process according to claim 3 wherein the calcium oxide, calcium hydroxide, or mixture of calcium oxide and calcium hydroxide contains 3 to 25 wt. % of iron oxide.

5. A process according to claim 1 wherein the calcium oxide, calcium hydroxide, or mixture of calcium oxide and calcium hydroxide contains 3 to 25 wt. % of iron oxide.

6. A process according to claim 5 wherein at least a portion of the iron oxide is present as fly ash from a furnace.

7. A process according to claim 4 wherein at least a portion of the iron oxide is present as fly ash from a furnace.

8. A process according to claim 3 wherein at least a portion of the iron oxide is present as fly ash from a furnace.

9. A process according to claim 2 wherein at least a portion of the iron oxide is present as fly ash from a furnace.

10. A process according to claim 1 wherein at least a portion of the iron oxide is present as fly ash from a furnace.

11. A process according to claim 1 wherein the gaseous reactants formed are halogen free and are comprised of (a) hydrogen, methane and carbon monoxide or (b) hydrogen, methane and other lower hydrocarbons.

12. A process according to claim 1 wherein the gaseous reactants formed are halogen free and consist essentially of hydrogen, methane and carbon monoxide.

* * * * *